United States Patent [19]
Athanasiadis

[11] Patent Number: 5,491,924
[45] Date of Patent: Feb. 20, 1996

[54] SPRING POWERED FISHLINE CASTING INSTRUMENT

[76] Inventor: Elias Athanasiadis, 150-12 Grand Central Pkwy., Jamaica, N.Y. 11432

[21] Appl. No.: 349,798

[22] Filed: Dec. 6, 1994

[51] Int. Cl.⁶ .................................................. A01K 97/00
[52] U.S. Cl. .................................................. 43/19; 124/27
[58] Field of Search ........................ 43/19, 6; 124/26, 124/27, 37

[56] References Cited

U.S. PATENT DOCUMENTS

| | | | |
|---|---|---|---|
| 1,347,433 | 7/1920 | Allen | 124/27 |
| 3,001,316 | 9/1961 | Fefelov | 43/19 |
| 3,059,630 | 10/1962 | Oreskey | 43/19 |
| 3,292,295 | 12/1966 | Saltness | 43/19 |
| 3,365,834 | 1/1968 | Kreft | 43/19 |
| 3,656,252 | 4/1972 | Sherman | 43/19 |
| 3,717,947 | 2/1973 | Nomura | 43/19 |
| 3,962,812 | 6/1976 | Moon | 43/19 |

*Primary Examiner*—P. Austin Bradley
*Assistant Examiner*—Jeanne M. Elpel
*Attorney, Agent, or Firm*—Nicholas J. Garofalo

[57] ABSTRACT

A manually held instrument having an elongated tube containing a compressed spring unit, into which tube a sinker of a connected fishline is adapted to be entered into abutment with the compressed spring unit. A stop restraining expansion of the compressed spring unit is adapted to be finger released by the fishman; and, when the stop is released from the compressed spring unit, the latter forcefully expands to cast the abutting sinker and connected fishline an appreciable distance from the instrument into the water. A pushrod slidable in an elongated support mounted to the body of the instrument may be removed by the fishman and entered into the elongated tube to return the spring unit to its compressed condition restrained by the stop.

3 Claims, 1 Drawing Sheet

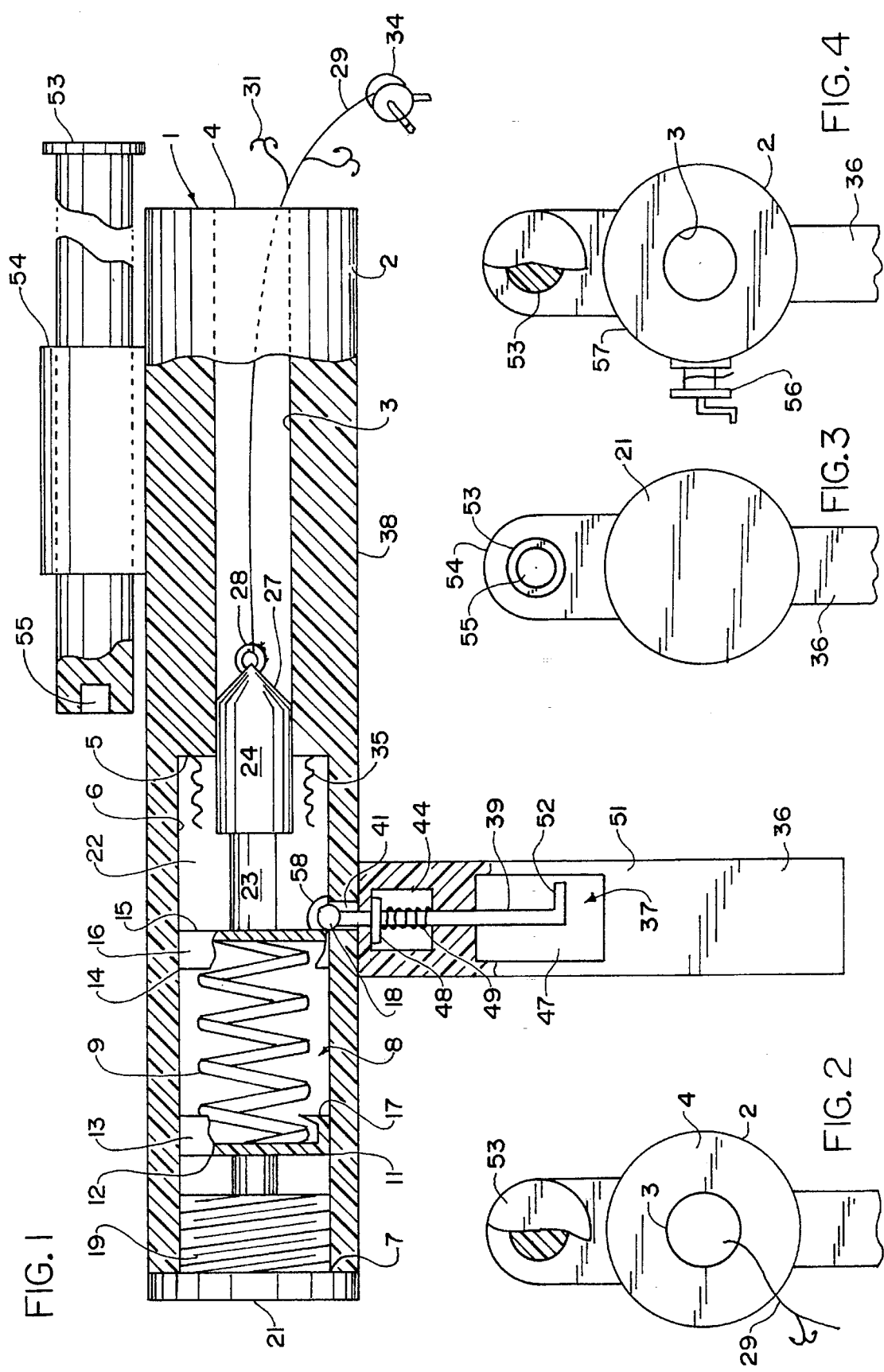

SPRING POWERED FISHLINE CASTING INSTRUMENT

BACKGROUND OF THE INVENTION

This invention relates to the sport of fishing. More particularly, it is concerned with the provision of means for casting a fishline, together with attached hooks and sinker over an appreciable distance into the water, and to do so in an easy manner that avoids the undesirable features associated with the conventional methods of pole casting a fishline.

It is customary, when one is fishing from land or boat with the hooked end of the line and the attached sinker, dangling from the pole, to swing the pole forcefully to throw the fishline into the water. The fishline unwinds from the reel as it is thrown toward the water. Often as the fishline is cast in this manner, the hooked end of the line is caught in the fisman's clothing, or the clothing of a neighboring person. At times the body of the fishman or that of another is caught by the hook, resulting in painful injury. At other times, the fishline is caught in overhanging branches when casting the line. This undesirable hooking and snagging of the line when casting may occur, whether the pole is swung forwardly, angularly, over the shoulder or in some other manner.

Accordingly, the general object of this invention is to provide means enabling the fishman, whether fishing from land or boat, to cast a hooked line together with a sinker an appreciable distance into the water without fear of causing the undesirable accidents mentioned above.

A more particular objective is to provide casting means which does not use a pole, is safe in its mode of operation without fear of hooking or snagging of the line, is manually operable, and will propel a hooked line and sinker an appreciable distance into the water corresponding to the distance normally obtained under present methods of pole casting a fishline.

A more specific objective of the invention is to provide an instrument which is spring powered and finger operable to propel with the force of an expanding spring a hooked fishline and sinker over an appreciable distance into the water.

A feature of the invention is in the simple nature of its structure, in the means for obtaining a compressed condition of a spring unit within the instrument, and in the nature of finger operable mean for releasing the compressed condition of the spring unit so as to allow the expanding spring to propel a sinker and fishline from the instrument over an appreciable distance into the water.

A further feature of the invention is a pushrod which is mounted to the instrument and is readily available to restore the spring unit to compressed condition following its expansion.

BRIEF SUMMARY OF THE INVENTION

The means for obtaining the foregoing objectives and features in the sport of casting a fishline and sinker, whether from land or water, is a manually held finger operable spring powered instrument. It includes a tubular body having in its rear portion a spring unit adapted to be compressed and retained by a releasable stop therein, and having a tubular portion extending beyond the compressed spring unit of reduced diameter into which a sinker of a connected fishline is adapted to be received into abutment with the compressed spring unit. Finger operable means in a handle of the instrument is actuable to release the stop so as to cause the spring unit upon release of the stop to expand and propel the sinker from the instrument together with the fishline over an appreciable distance into the water. A pushrod removably mounted to the body of the instrument is available to be inserted into the instrument and effect recompression of the spring unit; and concurrent with this action the fishman acts to return the stop to again restrain the compressed spring unit.

The foregoing and other objects, features and advantages of the invention will appear more fully hereinafter from a consideration of the accompanying drawing and detailed description which follows. It is to be expressly understood, however, that the drawing illustrating an embodiment of the invention is for purposes of illustration and is not to be construed as defining the limits of the invention.

BRIEF DESCRIPTION OF THE DRAWING

FIG. 1 is a longitudinal side view, partly in section, of an instrument embodying the invention;

FIG. 2 is a front end view of FIG. 1; and

FIG. 3 is a rear end view of FIG. 1. and

FIG. 4 is a detail view of a modified form of the structure of the instrument. It shows the reel mounted to a side of its body.

DETAILED DESCRIPTION OF THE INVENTION

In the accompanying drawing is an instrument 1 illustrating an embodiment of the invention. It includes a body in the form of an elongated tube 2. Within the tube is an axially extending annular channel 3, which opens through the front end 4 of the body or tube, and which opens at its rear end 5 at about midway of the tube into an axially aligned chamber 6 of larger diameter. The chamber opens at 7 through a rear end of the body or tube 2. Entered into the chamber through its open rear end 7 is a spring unit 8. It includes a coil spring 9 which is seated at its rear end in a cap 11. The cap has a circular flat radially extending backwall 12 and an annular flange 13 extending forwardly about the spring. The spring 9 is seated at its forward end in a cap 14 which has a circular flat radially extending backwall 15 and an annular flange 16 extending rearwardly about the spring. The flange of each cap is provided with teeth 17 which grip the cap fast to the spring.

When the spring unit is entered into the chamber 6 it is in an uncompressed condition; and it is moved forwardly into the chamber to a normal position in which the backwall 15 of the cap 14 abuts a stop 18 that is normally projecting into the chamber 6. It extends radially into the chamber. The uncompressed spring unit progressively obtains a compressed spring condition against the stop as a screw-plug 19 is threaded into the rear end 7 of the chamber against the backwall 12 of the rear cap 11; and the spring unit becomes substantially compressed as a rear shoulder 21 of the screw-plug limits against the rear end 7 of the body or tube 2, as appears in FIG. 1. Between the stop 18 and the shoulder 5 is a space 22 in chamber 6 which allows the compressed spring unit, when released from the restraining stop, to fully expand and move until it abuts the shoulder 5.

Projecting axially forward in the chamber 6 from the backwall 15 of cap 14 at the front end of the spring unit is a ramrod 23. Channel 3, which is of reduced diameter relative to that of chamber 6, is intended for reception and movement therein of a fishline weight or sinker 24. The sinker has a diameter complementing the diameter of the channel, whereby it may slide along the channel without wobble. The sinker has a flat radial rear end wall intended, upon entry of the sinker into the channel, to be brought into abutment with an opposed front end wall of the ramrod. The sinker has a coned front end 27 at the peak of which is a ring 28 to which an end of a fishline 29 bearing hooks 31 is attached. The sinker is of a length preferably such that, when the sinker is entered into the channel 3, a rear portion will extend into chamber 6 and abut the ramrod and a forward portion of the sinker will extend into the channel 3, as appears in FIG. 1.

When casting of the fishline into the water is to be made, the sinker with the fishline connected to it will be moved upon entry into the channel 3 into abutment with the ramrod 23. When the stop 18 is then removed from its position abutting and restraining expansion of the compressed spring unit, the inherent power and force of the compressed spring 9 will cause the spring unit to forcefully expand into the space 22 of chamber 6 and, by means of the ramrod propel the sinker and fishline out of the instrument into the water. As the sinker and fishline literally fly out of the instrument, the fishline will progressively unwind from a reel 34. As earlier explained, the shoulder 5 at the forward end of chamber 6 will limit the extent of forward travel of the spring unit. Coil springs 35 projecting rearwardly from the shoulder 5 serve to cushion impacting force of the spring unit against the shoulder.

Suitable means is provided enabling the fishman, when using the instrument for casting a fishline, to manually release the stop 18 from the chamber 6 so as to allow the compressed spring unit to expand and cast the sinker and fishline from the instrument into the water. While the releasing means may take various forms, here the means is provided for convenience of its operation in a handle 36 of the instrument 1; and it is arranged in a manner so as to protect against the stop being accidentally released. The handle extends downward from a rear portion of the underside wall 38 of the tube 2. The stop is in the form of a knob. And the stop release means, generally indicated at 37, includes a stop release rod 39 depending from the bottom of the stop, as indicated in FIG. 1, in orderly sequence through a hole 41 in the underside wall 38 of tube 2, through the top end of the handle into an opening 44 in the handle, and then through a bottom end of the opening 44 into an enlarged opening 47 in the handle. A shoulder 48 about the rod 39 is located in the opening 44. Suitable spring means, such as a coil spring 49 about the rod, expanded between the shoulder and the bottom of the opening 44, biases the rod upward to abut the shoulder against the upper end of the opening 44 and to raise the stop 18 into the chamber to a normal position abutting the compressed spring unit, as appears in FIG. 1. The rod 39 is of square form to avoid turning of the rod relative to the openings through which it passes.

In order to enable and facilitate withdrawl of the stop 18 from its abutment with the compressed spring unit, the enlarged opening 47 opens through opposite sides 51 of the handle, and the release rod 39 has at its bottom end a laterally extending arm or trigger 52. To effect expansion of the compressed spring unit and a resulting casting of the sinker and fishline from the instrument, the fishman will insert a finger into the enlarged opening 47 and press downward upon the trigger 52. This action will pull the release rod downward and draw the stop 18 into the hole or pocket 41 clear of the chamber 6 and out of the path of the compressed spring unit. The latter will then expand, as earlier described, to forcefully propel the sinker and fishline from the instrument. The sinker is preferably of a weight and the driving force of the spring unit upon expansion from a compressed condition is such as to propel the sinker a distance of from ten to fifteen feet from the instrument.

The trigger end 52 of the release rod is confined entirely within the enlarged opening 47, protected by the neighboring portions of the handle 36 against being accidentally operated to release the stop 18 from the path of a compressed spring unit in the instrument.

To return the spring unit to its compressed condition after it has been expanded, a push-rod 53 is provided. The push-rod is located in an elongated tube 54 extending parallel to and mounted atop the tube 2 of the instrument. The push-rod is accordingly located and accessible for ready use. To recompress the spring unit, the fishman holds the stop release rod down so as to draw the stop out of the chamber 6 and, while he does this, he inserts the push-rod into the channel 3 to engage a recess 55 in the bottom end of the push-rod over the ramrod 23. He then manually pressures the push-rod to compress the spring unit and to move it rearwardly of the pocket 41 of the stop 18. A return of the spring unit to its compressed condition beyong the pocket 41 can be observed through a sidewall opening 58. He then returns the stop to its normal position within the chamber 6 in front of the compressed spring unit.

The fishline reel 34 may, as indicated in FIG. 1, be located apart from the instrument 1; or, as indicated in FIG. 4, the reel 56 may be fixed to a side wall area 57 of the tube 2.

Apart from the spring elements of the instrument, the various components are preferably of plastic material.

While an embodiment of the invention has been illustrated and described in detail, it is to be expressly understood that the invention is not limited thereto. Various changes of form, design or arrangement may be made in its components without departing from the spirit and scope of the invention. It is my intent, therefore, to claim the invention not only as shown and described but also in all such forms and modifications or equivalents thereof as may be reasonably construed to be within the spirit of the invention and the scope of the appended claims.

What is claimed is:

1. A spring powered fishline casting instrument, the instrument comprising: an elongated body, an annular channel extending into the body from a front end of the body, an annular chamber of larger diameter than that of the channel extending into the body from a rear end of the body and in axial alignment with the channel, an annular shoulder defined by the larger diameter chamber at a point of junction of the chamber with the channel, a compressible coil spring unit entered into the chamber through the rear end of the chamber, a stop projecting radially through the body into a portion of the chamber forwardly of the spring unit and limiting the extent to which the spring unit may be entered into the chamber, a screw-plug threadable into the rear end of the body into abutment with a rear end wall of the spring unit and adapted to compress the spring unit against the stop as the screw-plug is progressively threaded into the chamber, the spring unit having a ramrod extending axially forward in the chamber from a front wall of the spring unit, the channel adapted to have a fishline connected sinker entered into it through the front end of the channel and moved into abutment with the ramrod, and manually operable means connected with the stop for releasing the stop from its abutment with the compressed spring unit so as to allow the compressed spring unit to expand in the chamber and with the force of its expansion cast the fishline connected sinker out of the channel, wherein an open ended support is mounted to the body of the instrument in which a push-rod is received, the push-rod being removable from the support and adapted to be inserted into the channel into abutment with the ramrod of the spring unit following expansion of the spring unit and adapted under manual pressure to return the spring unit to a compressed condition.

2. A spring powered fishline casting instrument, the instrument comprising: an elongated body, an annular channel extending into the body from a front end of the body, an annular chamber of larger diameter than that of the channel extending into the body from a rear end of the body and in axial alignment with the channel, an annular shoulder defined by the larger diameter chamber at a point of junction of the chamber with the channel, a compressible coil spring unit entered into the chamber through the rear end of the chamber, a stop projecting radially through the body into a portion of the chamber forwardly of the spring unit and limiting the extent to which the spring unit may be entered into the chamber, a screw-plug threadable into the rear end of the body into abutment with a rear end wall of the spring unit and adapted to compress the spring unit against the stop as the screw-plug is progressively threaded into the chamber, the spring unit having a ramrod extending axially forward in the chamber from a front wall of the spring unit, the channel adapted to have a fishline connected sinker entered into it through the front end of the channel and moved into abutment with the ramrod, and manually operable means connected with the stop for releasing the stop from its abutment with the compressed spring unit so as to allow the compressed spring unit to expand in the chamber and with the force of its expansion cast the fishline connected sinker out of the channel, wherein the annular shoulder defined at the point of junction of the chamber with the channel is adapted to limit the extent of forward movement of the spring unit upon expansion of the spring unit, and springs projecting rearwardly into the chamber are adapted to cushion impacting force of the spring unit against the shoulder.

3. A spring powered fishline casting instrument, the instrument comprising: an elongated body, an annular channel extending into the body from a front end of the body, an annular chamber of larger diameter than that of the channel extending into the body from a rear end of the body and in axial alignment with the channel, an annular shoulder defined by the larger diameter chamber at a point of junction of the chamber with the channel, a compressible coil spring unit entered into the chamber through the rear end of the chamber, a stop projecting radially through the body into a portion of the chamber forwardly of the spring unit and limiting the extent to which the spring unit may be entered into the chamber, a screw-plug threadable into the rear end of the body into abutment with a rear end wall of the spring unit and adapted to compress the spring unit against the stop as the screw-plug is progressively threaded into the chamber, the spring unit having a ramrod extending axially forward in the chamber from a front wall of the spring unit, the channel adapted to have a fishline connected sinker entered into it through the front end of the channel and moved into abutment with the ramrod, and manually operable means connected with the stop for releasing the stop from its abutment with the compressed spring unit so as to allow the compressed spring unit to expand in the chamber and with the force of its expansion cast the fishline connected sinker out of the channel, wherein an open-ended tube is mounted atop the body of the instrument in which a push-rod is received, the push-rod being removable from the tube and adapted to be inserted into the channel into abutment with a front end of the spring unit following expansion of the spring unit and adapted under manual pressure to return the spring unit to a compressed condition, and a fishline reel having said fishline adapted for connection with said sinker mounted to a side of the body of the instrument.

* * * * *